United States Patent [19]

Surles

[11] Patent Number: 5,377,759

[45] Date of Patent: Jan. 3, 1995

[54] FORMATION TREATING METHODS

[75] Inventor: Billy W. Surles, Houston, Tex.

[73] Assignee: Texaco Inc., White Plains, N.Y.

[21] Appl. No.: 64,313

[22] Filed: May 20, 1993

[51] Int. Cl.$^6$ .......................................... F21B 33/138
[52] U.S. Cl. .................... 166/295; 166/300; 523/131
[58] Field of Search ............... 166/295, 300; 523/130, 523/131

[56] References Cited

U.S. PATENT DOCUMENTS

| | | | |
|---|---|---|---|
| 4,427,069 | 1/1984 | Friedman | 166/295 |
| 4,842,072 | 6/1989 | Friedman et al. | 166/295 |
| 5,005,648 | 4/1991 | Friedman et al. | 166/295 |
| 5,199,492 | 4/1993 | Surles et al. | 166/295 |

Primary Examiner—George A. Suchfield
Attorney, Agent, or Firm—James L. Bailey; Kenneth R. Priem; Harold J. Delhommer

[57] ABSTRACT

Disclosed are methods for treating wells to form a permeable barrier around the well for consolidating unconsolidated mineral particles such as sand in a subterranean petroleum formation penetrated by a well, or for forming an impermeable barrier for fluid entry control, or for plugging the well for abandonment. A fluid containing a polymerizable resin such as furfuryl alcohol, a polar organic diluent such as butyl acetate and a mixture of oil soluble acid catalysts including one low pK and one high pK acid to cause polymerization of the resin at formation temperatures is prepared. The preferred low pK acid is toluene sulfonic acid and the preferred high pK acid is oxalic acid. The two acids and total acid concentration are selected to cause the polymerization reaction to be essentially complete in from 0.75 to 4.0 hours and preferably 1.0–2.0 hours at the formation temperature. This fluid is injected into the formation to saturate at least a portion of the formation adjacent to the well. In one embodiment, to form a permeable treated zone for sand control, an aqueous fluid comprising water which is from 70 to 100% saturated with inorganic salts including sodium chloride is injected into the same portion of the formation contacted by the resin containing fluid. The injected resin-containing fluid is allowed to remain in the formations for at least four hours to accomplish at least partial polymerization of the resin, forming a permeable or impermeable mass around the wellbore.

38 Claims, No Drawings

FORMATION TREATING METHODS

REFERENCE TO COPENDING APPLICATIONS

This application is related to Pending application Ser. No. 07/909,479 filed Jul. 6, 1992, now U.S. Pat. No. 5,282,849, for FORMATION TREATING.

FIELD OF THE INVENTION

This invention concerns formation and well treating methods including in one important embodiment, a method for treating wells completed in subterranean formations containing unconsolidated particulate matter, e.g. unconsolidated sand, in order to bind the unconsolidated sand grains together in the portions of the formation immediately adjacent to the perforations of the well, and thereby form in this embodiment a stable yet still fluid permeable barrier around the wellbore, in order to facilitate production of fluids from the formation while restraining the movement of sand into the wellbore during the fluid production phase. In another embodiment, a method results in the creation of an essentially impermeable barrier around the wellbore to exclude flow of fluids including water from the formation into the well. In yet another embodiment, the area around the well and the interior of the well are filled with an impermeable mass so the well can be abandoned safely. More particularly, this invention pertains to a method for accomplishing sand consolidation, water exclusion or well plugging in producing oil wells by use of a single fluid containing the polymerizable resins with the catalyst comprising at least two acids of different pK values already mixed with the resin in order to achieve more predictable and reproducible reaction rates and times. In particular, preferred embodiments of this invention permit treating wells completed in formations whose temperatures are from 60° F. (15.5° C.) to 200° F. (93.3° C.) or greater with set times below 24 hours.

BACKGROUND OF THE INVENTION

Formation treating for purposes of sand consolidation, water exclusion or well plugging for abandonment are well known terms applying to procedures routinely practiced in the commercial production of petroleum. When wells are completed in petroleum-containing formations which also contain unconsolidated granular mineral material such as sand or gravel, production of fluids from the formation causes the flow of the particulate matter, e.g. sand, into the wellbore, which often leads to any of several difficult and expensive problems. Sometimes a well will "sand up", meaning the lower portion of the production well becomes filled with sand, after which further production of fluid from the formation becomes difficult or impossible. In other instances, sand production along with the fluid results in passage of granular mineral material into the pump and associated hardware of the producing well, which causes accelerated wear of the mechanical components of the producing oil well. Sustained production of sand sometimes forms a cavity in the formation which collapses and destroys the well. All of these problems are known to exist and many methods have been disclosed in the prior art and applied in oil fields in order to reduce or eliminate production of unconsolidated sand from a petroleum formation during the course of oil production.

Another problem encountered in oil production to which the present process offers an attractive solution is encountered when a well is in fluid communication with a section that includes one or more oil producing intervals and one or more water-producing intervals. Production from such a zone results in production of some oil and some water. Since the viscosity of water is less than the viscosity of oil, a much larger volume of water than oil is frequently produced. Certain embodiments of the present invention allow creation of a fluid-impermeable barrier around the well in the water-producing intervals to reduce or eliminate the flow of water from the formation into the well.

In yet another embodiment, the resin-catalyst mixture can be used to completely plug a well which is to be abandoned. This embodiment requires a slightly greater volume of resin-catalyst mixture to be used, since the best results for this embodiment require that the interior of the well casing and/or tubing be filled completely with the resin for all or a substantial amount of its length. The long term durability of the material used to plug wells for abandonment is of high current interest because of the danger that salt water or petroleum might enter and contaminate fresh water-containing intervals.

The above-described sand control problems and potential solutions to the problems have been the subject of extensive research by the petroleum industry in the hope of developing techniques which minimize or eliminate the problems such as the production of sand particles into the producing well and associated equipment during the course of producing fluids from the formation. One general approach suggested in the prior art for consolidating sand to form a fluid permeable zone around the well involves consolidating the porous but unconsolidated sand structure around the wellbore in order to cement the loose sand grains together, thereby forming a permeable mass which will allow production of fluids from the formation into the well but which will restrain the movement of sand particles into the wellbore when used for fluid exclusion. Another approach involves removing a portion of the formation around the well and packing specially prepared granular material into the formation around the wellbore which is subsequently caused to be cemented together in a manner which maintains fluid permeability.

It is a primary objective of any successful sand consolidation method that a barrier be formed around the wellbore which restrains the movement of sand particles into the well while offering little or no restriction to the flow of fluids, particularly oil, from the formation into the wellbore where it can be pumped to the surface of the earth. Consolidation only needs to extend into the formation to a depth of 6 to 12 inches around the periphery of the perforations or other openings in the outer casing of the production well.

The objective of a water exclusion or fluid entry control process is to form an impermeable barrier around the well to prevent the flow of sand and formation fluids into the well. A process similar to that used to control sand problems can be used for plugging formation for water exclusion, provided the process is modified to cause creation of an impermeable barrier rather than a permeable barrier.

The objective of a well plugging process is similar to the water exclusion method described above, except that the interior of the well is also filled with the resin, to ensure that no fluid movement from one formation zone to another will occur after the well is abandoned.

A very important quality of a satisfactory sand consolidation method, plugging or water exclusion method is durability of the permeable or impermeable barrier formed around the wellbore. Once a permeable barrier is formed and the well is placed on production, there will be a continuing flow of fluids through the flow channels within the permeable barrier, and it is important that the barrier last for a significant period of time, e.g. several months and preferably years, without excessive abrasive wear or other deterioration of the consolidation matrix which would cause the particulate matter to flow once again into the wellbore.

It is also important that the material injected into the formation for all of my formation treating methods described above should be essentially unreactive during the period it is inside the wellbore, i.e. while it is being pumped down the well and positioned where it is desired adjacent to the perforations of the production casing. It is this desire to delay the polymerization reaction that has lead prior art methods to employ multi-step procedures in which first a catalyst is injected into the formation, after which the polymerizable resin-containing fluid is injected. While this reduces the propensity for the fluid to polymerize in the wellbore, it does give rise to several problems which constitute inherent weaknesses in many prior art methods for accomplishing sand consolidation. First, each separate injection step increases the time and cost associated with the well treatment by which sand consolidation, water shut off or well plugging is accomplished. Second, injection of catalyst into the formation in advance of the polymerizable fluid does not accomplish uniform mixing of catalyst with all of the polymerizable fluid which is needed to ensure optimum polymerization of the resin, which is essential for strength and durability of the consolidated mass. Use of aqueous fluids to inject catalyst often gives rise to the need for yet additional steps to clean the sand to remove formation petroleum so the catalyst will be absorbed by the sand and later mix with the subsequently injected resin containing fluid.

PRIOR ART

Many processes and materials have been utilized for treating formations for consolidating sand in the formation adjacent to production of wellbores or to plug wells to control fluid entry into the well or to prepare the well for to abandonment. One of the more successful agents utilized for this purpose is furfuryl alcohol resin which can be polymerized to form a solid matrix which binds the sand grains together, while at the same time offering superior resistance to high temperatures and to caustic substances which may be encountered in steam flood operations. One of the problems in utilizing furfuryl alcohol resin to polymerize in the formation is in accomplishing uniform catalysis of the polymerization reaction. Many catalysts that are effective for polymerizing furfuryl alcohol resins cannot be admixed with the furfuryl alcohol to permit employing a single fluid containing both the resin and the catalyst to be injected into the formation, because the time of polymerization is so short or unpredictable that there is excessive danger that the resin will polymerize in the injection wellbore.

In U.S. Pat. No. 4,427,069 there is disclosed a procedure for consolidating sand in a formation adjacent to a wellbore using an oligomer of furfuryl alcohol, in which the catalyst used is a water soluble acidic salt, preferably zirconyl chloride, which is injected in an aqueous solution into the formation prior to injection of the resin-containing fluid. The salt absorbs on the sand grains, and sufficient acidic salt remains adsorbed on the sand grain during the subsequent resin fluid injection stage that adequate polymerization occurs. Although this has been effective in many difficult situations where sand consolidation procedures are utilized, specifically in connection with thermal flooding such as steam injection procedures, the procedure nevertheless requires a multi-fluid injection procedure which requires more time and is more expensive than is desired. Usually a preliminary sand cleaning step is required before injecting the aqueous-catalyst solution in order to remove the naturally-occurring oil film from the sand grains to ensure good catalyst adsorption on the sand. Also, although catalyst mixes with the subsequently-injected polymer to a limited degree, usually sufficient to cause some polymerization, optimum performance can only be achieved if the catalyst-resin mixture can be made more homogenous prior to polymerization, in order to achieve a dense strong durable consolidation mass.

In U.S. Pat. No. 4,842,072 for "SAND CONSOLIDATION" there is disclosed a particularly effective method for consolidating sand utilizing a mixture of a polymerizable resin such as an oligomer of furfuryl alcohol and a diluent such as butyl acetate and an oil soluble, slightly water soluble acid catalyst such as orthonitrobenzoic acid which is injected followed by injection of salt water to reestablish permeability.

In U.S. Pat. No. 4,903,770 for "SAND CONSOLIDATION" there is disclosed a preferred process which is more easily removed after a period of use and which is quite inexpensive. The process employs a fluid comprising a polymerizable monomer such as furfuryl alcohol and as a diluent, a polar organic solvent such as methanol and a strong, non-volatile acid catalyst such as sulfuric acid, mixed with steam to form a multiphase or aerosol treating fluid, and injected into the formation to be consolidated. An ester such as ethyl or butyl acetate is incorporated in the fluid when the steam quality is less than 80 percent.

In U.S. Pat. No. 4,669,543 which issued Jun. 2, 1987, there is described a method for consolidating sand using an acid-curable resin and utilizing as a catalyst, the reaction product of an acid, and an alkyl metal or ammonia molybdate. In that instance, the catalyst is incorporated in an aqueous carrier fluid which comprises the continuous phase of an emulsion in which the polymerizable resin is the dispersed or discontinuous phase. Thus this process requires that the emulsion be resolved or broken after it is located in the portion of the formation where the permeable consolidating mass is desired, which is difficult to achieve to the high degree of completion necessary to accomplish the desired strong durable consolidating matrix necessary for a long lasting sand consolidation process.

U.S. Pat. No. 5,010,953 which issued Apr. 30, 1991 teaches a sand consolidating process using a polymerizable compound suck as furfuryl alcohol, a diluent such as a low molecular weight alcohol, an acid catalyst and an ester and as an additive to reduce shrinkage, a copolymer of starch and a synthetic polymer such as acrylamide or acrylate.

U.S. Pat. No. 5,005,647 which issued Apr. 9, 1991, discloses a process for shutting off permeable zones in wellbores to reduce excess water flow using fluids similar to that described in U.S. Pat. No. 5,010,953 discussed above.

U.S. Pat. No. 5,005,648 which issued Apr. 5, 1991 describes a method of treating permeable zones in a formation to reduce water flow into a well completed therein by injecting a fluid-containing polymerizable compound, an ester, and an acid catalyst such as orthonitrobenzoic acid or toluene sulfonic acid.

U.S. Pat. No. 4,938,287 which issued Jul. 3, 1990 describes a process in which a preflush such as ethyl or butyl acetate is injected into the sand to be consolidated to remove oily residue, followed by injecting the treating fluid containing the polymerizable resin, diluent, ester and acid catalyst to accomplish sand consolidation.

In copending application Ser. No. 07/909,479 filed Jul. 6, 1992, a formation treating method is disclosed using a fluid containing a polymerizable resin such as furfuryl alcohol, an acid catalyst such as toluene sulfonic acid or o-nitrobenzoic acid and an ester is disclosed. The acid and acid concentration are selected to result in a polymerization set time of 1-24 hours.

The above processes have been extremely successful in treating wells in many formations, especially in formations where the temperature exceeds 200° F. This is highly advantageous since many formations being steam stimulated and which cannot be treated by other processes, can be treated by this process with a high success ratio. When the temperature is much below 200° F., however, the concentration of the preferred acid, toluene sulfonic acid, needed to produce a set time or time required for polymerization of the furfuryl alcohol oligomer is very critical and I have found it is often difficult to control under field conditions. Thus there is still an unfulfilled need for a well treating method for sand consolidation, fluid exclusion or plugging wells prior to abandonment applicable to formations whose temperatures are below 250° F. (121.1° C.) and especially at formation temperatures below 175° F. (79.4° C.) which produce a set time less than 24 hours, preferably from 1-2 hours.

SUMMARY OF THE INVENTION

I have discovered methods for treating wells for consolidating sand or for forming a fluid-excluding impermeable barrier in the adjacent formation or for plugging a well prior to abandonment where the formation temperature is less than 250° F. and particularly when it is less than 175° F., to achieve a resin set time of from 0.75 to 4.0 hours and preferably in the range of 1.0–2.0 hours. A fluid comprising a polymerizable resin, preferably a derivative such as an oligomer of furfuryl alcohol, a diluent such as ethyl or butyl acetate and an oil soluble internal catalyst which can safely be mixed with the resin on the surface, is injected into the well and in one embodiment, into the surrounding unconsolidated sand. The acid catalyst is the key to the success of my process, since this process is applied to formations whose temperature may be less than 250° F. and particularly less than 175° F. In order to achieve a set time in the desired range and avoid excessive sensitivity of the set time to acid concentration, a mixture of acids is used. At least one acid having a pK in the range of 0.4 to 0.8 and at least one acid having a pK in the range of from 0.8 to 2.1 is employed. If the set time is below one hour, especially if it is below 0.75 hours, there is danger that the fluid which contains both the polymerizable compound and the acid catalyst, will polymerize in the surface mixing equipment or in the injection string. If the set time exceeds four hours there is danger that the polymerizable compound will be washed off the sand grains before polymerization occurs, resulting in a poor bond between the polymerized compound and the sand grains and a poor consolidation job or fluid exclusion job.

The key to my invention resides in the use of a mixture of two or more acids as the catalyst. A first acid has a pK in the range of 0.1 to 1 and preferably from 0.4 to 0.8. Examples of preferred first acids for the first acid are toluene sulfonic acid and xylene sulfonic acid. Other acids such as benzene sulfonic acid or picric acid may also be used. The second acid used in this mixture has a pK in the range of 0.8 to 4 and preferably from 0.8 to 2.1. Examples of acids for this component include oxalic acid, an especially preferred acid, and preferred acids including iodic acid, maleic acid, malonic acid, dichloroacetic acid, and trichloroacetic acid.

The ratio of the first acid to the second acid should be from 1 to 100 and preferably from 1 to 30. The total concentration of the acid mixture in the resin-containing treating fluid should be from 1 to 4 volume percent and preferably from 3 to 4 volume percent.

The treating fluid comprises from 20 to 80 and preferably 40 to 80 percent of the polymerizable resin, the acid catalyst described above, and an organic diluent. The preferred organic diluent is butyl acetate. To a mixture of butyl acetate, and acid mixture is added from 30 to 80 and preferably about 60% resin, e.g. the furfuryl alcohol oligomer. This homogenous organic fluid can then be injected via the injection string into the formation without danger of premature polymerization. When this well treating process is being applied for sand consolidation, the next step is injection of an aqueous saline solution which is from 70% to 100% saturated with inorganic salt, preferably sodium chloride, into the resin-saturated zone of the formation, to open flow channels within the void spaces in the formation into which the resin catalyst mixture had been injected without removing the polymerizable resin. The salt water also modifies the resin coating on the sand, removing water therefrom, which increases the strength and durability of the polymerized resin matrix. The brine postflush is not used when an impermeable barrier is desired. The well is then shut in for a period of from 0.75 to 4.0 hours and preferably from 1–2 hours. This two-step procedure results in the formation of a permeable, durable, consolidated sand mass around the perforations of the wellbore which restrains the movement of sand into the wellbore during production operations, while permitting relatively free flow of formation fluids, particularly formation petroleum, into the wellbore.

When my well treating process is applied for the purpose of plugging zones to prevent undesired fluid entry into the well, or to plug an entire well prior to abandonment, essentially the same polymer, diluent and acid catalyst is injected in essentially the same manner, but the salt water injection step is not used.

DETAILED DESCRIPTION OF THE PREFERRED EMBODIMENTS

I have discovered, and this constitutes my invention, that it is possible to accomplish an improved well treating process such as sand consolidation method, water exclusion or well plugging utilizing the sand naturally occurring in the formation in a process employing a single treating fluid injection step, plus in some embodiments a brine injection step. A mixture of polymerizable resin, having dissolved or dispersed therein a dual acid catalyst for the polymerization step, and a organic polar diluent, is injected into the formation to saturate the void space in the portion of the formation adjacent to the production well. This accomplishes coating the formation granular material, e.g. the formation sand, with the mixture of polymerizable resin and catalyst. Since the fluid injected into the formation in this step is organic and contains a diluent, the minor amounts of formation petroleum and other oil-based materials coating and contaminating the surface of the sand grains is effectively removed or dissolved. It is a particular feature of this method that a separate preliminary wash step to remove materials coating the sand grains is not required. I have conducted laboratory tests, using formation sand containing crude oil, to which additional oil was deliberately added, and a successful consolidation by this method was achieved without any preliminary wash step.

In another embodiment of my well treating process, the same fluid is injected to coat the formation granular material and to fill the void spaces between the grains completely, to form an impermeable mass which restricts fluid movement into or out of the well.

The resin which I have found to be especially preferable for use in our well treating process is a furfuryl alcohol oligomer. Any resin which will polymerize upon exposure to heat and contact with an acid catalyst can be used in this process; however, furfuryl alcohol oligomer $(C_4H_3OCHO)_n$ is the particularly preferred polymerizable resin. This resin has the advantage of being relatively inexpensive and having the characteristic of autopolymerizing on exposure to acid catalyst, forming a thermal-setting resin which cures to an insoluble mass that is highly resistant to chemical attack as well as to thermal degradation. The particularly preferred commercial form in which this resin is available is "Quacorr 1300 ®" or "QO 1300 ®" (a furfuryl alcohol oligomer) sold by QO Chemicals. This resin is ordinarily obtained commercially in a form containing 90 to 95 percent furfuryl alcohol oligomer.

The furfuryl alcohol oligomer emulsion utilized in this process is so viscous that it must be diluted with an appropriate solvent in order to permit it to be pumped into the formation, and to accomplish relatively complete filling of void spaces in the formation. Any solvent for the furfuryl alcohol oligomer would accomplish this objective. It is possible, however, to accomplish this and another important objective by using as the diluent a hydrolyzable ester. The polymerization of the furfuryl alcohol oligomer produces water and the water produced by polymerization eventually limits the polymerization reaction. If water produced during polymerization of furfuryl alcohol oligomer can be removed, it is possible to force the polymerization reaction to proceed further toward completion and thereby produce longer polymer chains than would result if water were left in the polymer reaction mass. A hydrolyzable ester will remove water as it is produced, leading to the formation of longer chain polymers which result in a stronger, more durable polymer matrix which binds the sand grains together. Accordingly, my preferred diluent for the furfuryl alcohol oligomer is a hydrolyzable ester, and my especially preferred species is butyl acetate. Other preferred esters are methyl acetate, ethyl acetate and propyl acetate.

It is important for this procedure that the acid catalyst utilized be oil soluble so that it may be incorporated in the resin solvent solution. This permits thorough mixing of the catalyst which is essential in order to ensure that the polymerization reaction occurs uniformly throughout the entire mass of well treating chemical placed in the formation. Prior art methods which utilize a catalyst injected in a non-miscible fluid either before or after injection of the fluid containing the polymerizable resin, or present in a non-miscible phase of an emulsion polymer fluid, do not accomplish uniform reactions such as are possible by use of the present soluble catalyst. The catalyst for use in my invention must also be one which exhibits temperature sensitivity such that the catalytic polymerization does not occur during the time that the fluid is prepared and mixed on the surface of the earth or pumped into the formation. It is equally important that once the fluid is placed in the formation and left in a quiescent state for a period of time sufficient to ensure temperature equalization with the formation, that the polymerization reaction occur rapidly in order to permit completion of the procedure in an relatively brief period of time, so the well can be put on production as soon as possible. Because of this dual requirement, the catalyst choice and concentration are both very critical to the proper function of our invention.

The key to my invention resides in the use of a mixture of two or more acids as the catalyst. A first acid has a pK in the range of 0.1 to 1.0 and preferably from 0.4 to 0.8. Examples of preferred first acids for the first acid are toluene sulfonic acid and xylene sulfonic acid. Other acids such as benzene sulfonic acid or picric acid may also be used. The second acid used in this mixture has a pKA in the range of 0.8 to 4 and preferably from 0.8 to 2.1. Examples of acids for this component include oxalic acid, a preferred acid, iodic acid, maleic acid, dichloroacetic acid, and trichloroacetic acid.

The ratio of the first acid to the second acid should be from 1 to 100 and preferably from 1 to 30. The total concentration of the acid mixture in the resin-containing treating fluid should be from 1 to 4 volume percent and preferably from 3 to 4.

The use of two acids of different pK values was originally intended to reduce the sensitivity of the polymerization reaction to variations in acid concentrations to simplify using the process under field conditions where precise control over component concentration is difficult to achieve. The dual acid system has satisfied this objective very well. I have observed that there are several unexpected additional benefits from use of the dual acid catalyst. There appears to be a slight synergistic effect, in that the desired resin set time can be achieved using slightly less of the dual acid catalyst than would be predicted from the set time of corresponding fluids using a single acid catalyst. Also, when a single acid catalyst resin fluid is mixed with polymers to cause expansion of the resin on setting, such as a copolymer of starch and polyacrylamide, an increase in acid required for polymerization has been observed. This increase in acid required for a desired set time when the expanding copolymer is incorporated in the fluid, does not occur when the dual acid catalyst of the present invention is used.

I have found that the desired set time of from 0.75 to 4.0 and preferably from 1–2 hours can be realized for any particular formation temperature in the range of 60° F. to greater than 250° F. and especially from 60° F. to 175° F. if the two acid components of the acid mixture catalyst and the concentration of each acid as well as the total concentration of the acid mixtures are carefully selected.

The pK of an organic acid is defined as the negative of the log of the ionization constant of the acid and is essentially an inverse scale measure of the strength of the acid, e.g. strong acids have lower pK values. The lower pK acid catalyst used in the acid mixture for this process is preferably an organic acid which is oil soluble and which has a pK in the range of 0.1 to 1.0. There is an especially preferred low pK acid for our process for each of several temperature ranges. For example, if the temperature is from 60° F. to 175° F., the low pK acid should have a pK from 0.4 to 0.8 and the especially preferred catalyst is toluene sulfonic acid, usually p-toluene sulfonic acid, although mixed isomers may also be used. In this temperature range, hydrochloric acid, nitric acid and sulfuric acid are also preferred acids. Mixtures of toluene sulfonic acid with the above may also be used. For convenience, a mixture comprising 95% toluene sulfonic acid with 5% xylene sulfonic acid has been used in the field because the mixture is liquid at field surface conditions and therefore easier to mix with the other fluids in preparing the treating fluid. This is a commercial product available under the trade name "WITCAT TX ACID ®" (a mixture of 95% toluene sulfonic acid and 5% xylene sulfonic acid sold by Witco Chemical Co. Other mixtures may also be used, to ensure that the melting point is below ambient temperature.

Table I below gives the pK of preferred low pK acids at several temperatures.

TABLE I

| Temperature °F. | pK of Low pK Acid | Examples |
|---|---|---|
| 60-175 | .4 to .8 | Toluene Sulfonic Acid, Hydrochloric Acid, Sulfuric Acid, Nitric Acid |
| 175-250 | .8 to 2.1 | Oxalic Acid, Iodic Acid, Maleic Acid, Di or Trichloroacetic Acid |

Once the low pK acid has been selected, the ratio of the low pK and high pK acid as well as the concentration of the acid mixture must be determined. The following table gives the relationship between toluene sulfonic acid catalyst and temperature to produce set time within the preferred 1-2 hour range.

TABLE II

| Temperature °F. | pK of Low pK Acid | Examples |
|---|---|---|
| 60° F. | 0.1% | 3% |
| 100° F. | 0.06% | 2% |
| 175° F. | 0.03% | 1% |
| 250° F. | 0.02% | 0.5% |

The following Table III gives the preferred concentration of toluene sulfonic acid over the full temperature range of my process.

TABLE III

| FORMATION TEMPERATURE | % TOLUENE-SULFONIC ACID |
|---|---|
| Up to 60° F. | 5.0-3.8 |
| 60-100° F. | 3.8-3.1 |
| 100-125° F. | 3.1-1.4 |
| 125-200° F. | 2.4-1.4 |

TABLE III-continued

| FORMATION TEMPERATURE | % TOLUENE-SULFONIC ACID |
|---|---|
| 200-225° F. | 1.4-.8 |
| 225-250° F. | .8-.5 |

Surprisingly, I have found that the above correlation holds for any mixture ratio of resin and ester, e.g. butyl acetate, over the volume ratio 90 to 10 to 40 to 60.

One preferred method for forming a particularly effective fluid for use in practicing the well treating process of my invention involves mixing an approximately 50-50 mixture of the resin in its commercial form, which is usually an emulsion, with butyl acetate, after which the dual acid catalyst such as a mixture comprising 3% toluene sulfonic acid and 0.1% oxalic acid is dissolved in this mixture of resin and ester.

The melting points of many of my preferred acids are above surface ambient temperatures. For example, the melting point of toluene sulfonic acid is 223° F., so it is often necessary to incorporate the acid in a suitable diluent, usually a low carbon alcohol such as methanol, to facilitate mixing it with the high pK acid and mixing the acid mixture with the resin emulsion. From 2 to 5 percent methanol is usually adequate for this purpose. This procedure may be used when applying the fluids described above for sand consolidation, when the well treatment is being used to shut off undesired water flow, or when the fluids are injected to completely plug a well, such as when the well is being prepared for abandonment.

The quantity of the fluid comprising the resin, diluent and catalyst injected into the formation varies depending on the purpose to be served by the treatment, e.g. sand consolidation, fluid entry prevention or complete well plugging for abandonment. The volume also varies with the thickness and porosity of the formation to which the well treating process is to be applied, as well as the diameter of the well and the desired thickness of the treated zone in the formation. The thickness and porosity of the formation and the diameter of the well will always be known, and it is ordinarily satisfactory if depth of the penetration is in the range of from 6 to 12 inches from the well bore. As an example, if it is desired to treat a formation whose thickness is 18 feet and porosity is 35% to form a permeable barrier for sand control just outside the perforations of the wellbore which is 8 inches (0.67 ft.) thick, and the well being treated is 10 inches in diameter (radius=5 in.=0.42 ft), then the volume of fluid necessary is calculated according to the example below.

$$(\pi (.42 + .67)^2 - \pi (.42)^2) (18) (.035) =$$

$$(1.188\pi - .1764\pi) (18) (.35) =$$

$$20.02 \text{ Cu. Ft.} = 149.8 \text{ Gallons}$$

About the same volume of salt water is used to create the permeable treated zone when the well treating method is being used for sand control.

In the preceding example the consolidation may be accomplished by forming an aerosol of the resin with a noncondensable gas such as nitrogen or air (in a 10 to 90 ratio). Reference is made to pending application Ser. No. 07/976,747 filed Nov. 16, 1992, now U.S. Pat. No.

5,284,206, for full disclosure of the formulation and use of an aerosol treating fluid.

About the same volume of resin-containing fluid will be required to treat an otherwise identical well to form a fluid impermeable barrier around the well for the purpose of reducing or preventing flow of fluid into the well. No salt water injection is used in this embodiment.

When a well is to be plugged completely as preparation for abandonment, a greater volume of fluid will be required, since it is necessary in this embodiment to treat a portion of the permeable formation outside the well perforations as above, and also to fill all or a major portion of the inside of the well casing or tubing, or of an open hole. In this case, the volume of fluid required for the same well described above is the amount shown in the above example plus enough to fill the inside of the well for 18 feet. The amount required is:

$$20.02 \text{ Cu. Ft.} + \pi (.4166)^2 (18) =$$

$$20.02 + 9.78 = 29.8 \text{ Cu. Ft.} =$$

$$222.93 \text{ Gallons}$$

After the above described quantity of fluid comprising resin, dual acid catalyst and diluent are injected into the formation, a second step is needed when my process is being used to form a permeable barrier for sand control. The polymerizable resin must be displaced from the injection string to avoid the possibility that the resin might polymerize in the wellbore. The fluid injected into the formation occupies essentially all of the void space of the formation, e.g. the volume other than the sand grains themselves in the portion of the formation contacted by the fluid. If this injected fluid polymerized without injecting any second fluid to displace a portion of the resin material from the void spaces of the formation, the resultant barrier would be strong and resistant to chemical attack but it would not be sufficiently permeable to permit flow of fluid through the formation into the wellbore.

The polymerizable resin used to prepare the sand consolidation matrix is normally available commercially as a mixture containing about 5 percent water. Additional water is formed by the condensation polymerization reaction. The strength of the sand consolidating polymer matrix will be increased if at least a portion of this water is removed before the resin polymerizes. I have found that the desired objective of displacing resin from the injection string for developing permeability within the sand consolidated mass and dewatering the polymer-containing fluid is best accomplished by injecting brine or water containing an inorganic salt, preferably sodium chloride, into the string to displace the residual amount of resin fluid from the injection string, and also to pass through the portion of the formation occupied by the resin fluid. Injection of the brine develops permeability within the treated portion of the formation which ensures that after the resin has polymerized, the resultant barrier will be permeable to the flow of fluids. The salinity of water utilized in this procedure is quite important. The surface of the resin coated sand grains should be dewatered in order to aid in the polymerization reaction and also in order to produce a denser stronger matrix cementing the sand grains together.

As a practical matter, the brine utilized as a post flush will probably be water containing mainly sodium chloride because of the cost and availability of sodium chloride in the field. This is a particularly preferred brine for my purpose. We have discovered that potassium chloride does not work well in this application, and so the fluid injected into the formation after the polymerization fluid has been injected should not contain appreciable quantities of potassium chloride. The quantity of brine injected into the formation for sand consolidation should be sufficient to displace all of the residual resin fluid from the injection string, and also sufficient to pass through the resin saturated portion of the formation. It is generally sufficient if about the same volume of brine as the polymerization fluid is utilized, and the rate at which it is injected is not particularly critical for my purposes. As a practical matter, the brine usually is not totally effective at displacing set polymer from the inside of the injection string. It is usually desirable to drill out any residual polymer before placing the well back on production.

When my well treatment process is used to form an impermeable barrier for fluid entry prevention, e.g. to reduce flow of water into the well, little or no brine is used. Although enough brine could be injected to flush all of the resin from the well interior, this is difficult to control. I have found it preferable to leave the resin-containing fluid in the well until it has set, and then drill out the well to remove the set resin to a point at least as deep as the bottom perforation from which production is taken. In some cases, the well is drilled out for a distance from 10 to 50 feet below the lowest production level to create a void (called a rat hole in the field) into which sand and other solids can fall and accumulate and thereby delay the time when it will become necessary to suspend oil production and bail out the well.

After the above steps of injecting the polymerization fluid and when applying the process for sand consolidation, the sodium chloride solution or brine are completed, the well should be shut in and left to stand for a period of from 1 to 4 and preferably at least 1 to 2 hours. In application of either the sand consolidation, well plugging or water shut off embodiments of my invention, leaving the well shut in for more than 2 hours will have no adverse effect on the process, and indeed the strength of the polymerized resin may increase in this additional period. The set time as described herein only defines the minimum time in which polymerization of the resin will proceed to a sufficient level to prevent washing the polymer from the sand grains.

EXPERIMENTAL SECTION

A series of experiments were performed under controlled laboratory conditions to determine the concentration of various preferred mixtures of low pK and high pK acids which produced a set time in the preferred 1.0–2.0 hour range over appropriate temperature ranges. The following Tables give the observed results.

TABLE IV

| DOWNHOLE TEMPERATURE | CONCENTRATION OF % TOLUENE SULFONIC ACID, WT. % | CONCENTRATION OF OXALIC ACID WT. % |
|---|---|---|
| Up to 60° F. | 1.3–1 | 4 to 3 |
| 60–100° F. | .1–.06 | 3 to 2 |
| 100–125° F. | .06–.45 | 2 to 1.5 |
| 125° F.–200° F. | .45–.03 | 1.5 to 1 |
| 200–225° F. | .03–.025 | 1 to .75 |
| 225–250° F. | .025–.02 | .75 to .5 |

More precise information on the effect of varying concentration of toluene sulfonic acid and oxalic on set times at different temperatures is given in Table V below.

TABLE V

| DOWNHOLE TEMPERATURE | CONCENTRATION OF % TOLUENE SULFONIC ACID, WT. % | CONCENTRATION OF OXALIC ACID WT. % | SET TIME |
|---|---|---|---|
| 60° C. | .1 | 3 | 2 hrs |
|  | .2 | 3 | ½ hr |
|  | .05 | 3 | 8 hrs |
| 100° F. | .06 | 2 | 2 hrs |
|  | .12 | 2 | ½ hr |
|  | .05 | 2 | 8 hrs |
| 175° F. | .03 | 1% | 2 hrs |
|  | .06 | 1% | ½ hr |
|  | .06 | 1% | 8 hrs |

FIELD EXAMPLE I—SAND CONSOLIDATION

For the purpose of complete disclosure, including what is now believed to be as the best mode for applying the process of my invention, the following pilot field example is supplied.

A producing well is completed in a subterranean petroleum containing formation, the formation being from 8560 to 8588 feet. Considerable sand production has been experienced in other wells completed in this formation in the past, and so it is contemplated that some treatment must be applied in order to permit oil production from this formation without experiencing the various problems of unconsolidated sand production. This particular well has not yet been used for oil production, and so little sand has been produced from the formation. It is known that the sand is coated with formation crude, but is otherwise of a reasonable particle size to accommodate sand consolidation process using the natural sand present in the formation. It is decided therefore to inject the treating fluid of my invention into the formation immediately adjacent to the perforation of the producing well in order to bind the naturally occurring sand grains together and form a stable mass which forms a permeable barrier to restrain the flow of formation sand into the well while still permitting the free flow of formation fluids including petroleum through the barrier. It is determined that it is sufficient to treat approximately 12 inches (1 foot) into the formation. Based on experience in this field, it is expected that the porosity of the formation to be treated is approximately 40%. The outside casing diameter of the well being treated is ten inches (radius=5.0 in. or 0.417 ft.). The volume of fluid necessary to treat this portion of formation is determined as follows:

$$V = (\pi(1.0+0.417)^2 - \pi(0.417)^2) \times (0.40)(28) = 64.5 \text{ Cu. Ft.} = 482.76 \text{ Gallons}$$

The formation temperature is 100° F. It is known that a resin set time of 2 hours can be achieved using 3.5% toluene sulfonic acid; however, the sensitivity of set time to variations in acid concentration is so high that field use is difficult. It is determined that good results can be achieved at this temperature using a blend of 0.06% toluene sulfonic acid and 2% oxalic acid. The best concentration of this blend is 3 volume percent based on the total volume of treating fluid.

In order to accomplish adequate saturation of the portion of the unconsolidated sand formation adjacent to the production well, a total of 490 gallons of resin treating fluid is required. The resin employed in this procedure is "QO-1300 ®" obtained from QO Chemicals, which is an oligomer of furfuryl alcohol. The 490 gallons of sand consolidation treating fluid is formulated by mixing 245 gallons of the above-described resin with 245 gallons of butyl acetate. Since the formation temperature is known to be 200° F., the desired concentration of toluene sulfonic acid is 0.03%. This requires 1.2 pounds of toluene sulfonic acid. In order to facilitate use of toluene sulfonic acid in this application, since the surface ambient temperature is 85° F., a mixture comprising 1.2 pounds toluene sulfonic acid and 4.9 gallons of methanol is prepared and this is mixed with 36 pounds of oxalic acid to produce the desired optimum mixture of toluene sulfonic acid and oxalic acid. The catalyst mixture is then added to the resin ester mixture. This fluid is injected into the formation at a rate of about 900 gallons per hour. After all of the treating fluid has been injected into the formation, 500 gallons of saturated sodium chloride brine is formulated and injected into the well at the same rate to displace the treating fluid out of the injection string and to force brine through the portion of the formation into which the treating fluid has been injected, displacing a portion of the treating fluid from the void spaces in the formation thereby forming flow channels in the resin zone. This ensures that the residual permeable barrier will exhibit sufficient permeability to permit production of fluids from the well. The well is shut in and is left for a period of 2 hours, which is adequate for this particular formation temperature. At the conclusion of this shut-in soak period, the well is drilled out to remove residual resin from inside the well, and to a point 30 feet below the bottom of the perforations to create a rat hole where produced sand can settle. The well is then placed on production and essentially sand-free oil production is obtained.

FIELD EXAMPLE II—FLUID ENTRY CONTROL

A producing well is completed in a subterranean petroleum containing formation, the petroleum formation being from 8540 to 8588 feet. This zone is treated as described above to control production of unconsolidated sand. Production of oil occurs without sand but excessive salt water is being produced from a twenty three foot thick zone located thirty feet above the oil production zone. It is decided therefore to inject treatment fluid into the water producing interval of the formation in order to form an impermeable barrier to exclude water from the formation. It is determined that it is sufficient to treat approximately 12 inches (1 foot) into the formation. Based on experience in this field, it is expected that the porosity of the water producing interval formation to be treated is also approximately 40%. The outside casing diameter of the well being treated is ten inches (radius=5 inches or 0.417 ft.). The volume of fluid necessary to treat this portion of formation is determined as follows:

$$\begin{aligned} V &= (\pi(1+.417)^2 - \pi(.417)^2)(23)(.40) \\ &= (5.76)(23)(.40) \\ &= 53.0 \text{ Cu. Ft.} \\ &= 396.6 \text{ Gallons} \end{aligned}$$

In order to accomplish adequate saturation of the portion of the unconsolidated sand formation adjacent to the production well, a total of 397 gallons of resin treating fluid is required. The resin employed in this procedure is the same "QO-1300®" described above obtained from QO Chemicals, which is an oligomer of furfuryl alcohol. The 397 gallons of treating fluid is formulated by mixing 278 gallons of the above-described resin with 119 gallons of butyl acetate. Since the formation temperature is known to be 60° F., the desired concentration of the mixture of toluene sulfonic acid is 0.1% and oxalic acid is 3%. This requires 3.3 pounds of toluene sulfonic acid and 99 pounds of oxalic acid. In order to facilitate use of toluene sulfonic acid in this application, since the surface ambient temperature is 85° F., a mixture comprising 3.3 pounds toluene sulfonic acid and 12 gallons of methanol is prepared the oxalic acid is added, and then added to the resin-ester mixture. A retrievable plug is set in the well at a point just below the formation being treated. This fluid is injected into the formation at a rate of about 900 gallons per hour. After all of the treating fluid has been injected into the formation, the well is shut in and is left for a period of 2 hours, which is adequate for this particular formation temperature. The interior of the well is drilled out to remove the hardened resin, and the retrievable plug is removed. At the conclusion of this treatment, the well is placed on production and essentially no water production is obtained from the treated zone.

FIELD EXAMPLE III—WELL PLUGGING

If the above well is to be abandoned, a treatment similar to Example II is employed, except the volume of treating fluid is increased so all permeable zones around the well are filled and the well interior is filled from the bottom to the point above the top of the uppermost perforations, and allowed to solidify. The residual resin in the well is not drilled out in this embodiment.

The additional volume required to fill the bottom 200 ft. of this well is $$V = \pi (.417)^2 (200)$$
$$= 109.2 \text{ Cu. Ft.}$$
$$= 817 \text{ Gallons}$$

This is in addition to the 397 gallons required to seal the formation outside the perforations.

Although my invention has been described in terms of a series of specific preferred embodiments and illustrative examples which applicant believes to include the best mode for applying his invention known to him at the time of this application, it will be recognized to those skilled in the art that various modifications may be made to the composition and methods described herein without departing from the true spirit and scope of my invention which is defined more precisely in the claims appended hereinafter below.

I claim:

1. A method for treating a well penetrating and in fluid communication with at least a portion of a subsurface formation, the temperature of the formation being known, comprising:
   (a) selecting a first oil soluble acid catalyst having a pK in the range of 0.1 to 1.0, and a second oil soluble acid catalyst having a pK in the range of 0.8 to 4.0;
   (b) forming a mixture comprising from 1.0 to 10.0 volume percent of the first acid and from 99.0 to 90.0 percent of the second acid;
   (c) providing a treating fluid comprising the polymerizable resin, a polar organic diluent for the resin, and a predetermined concentration of the mixture of the two oil soluble acid catalysts which will cause polymerization of the resin in from 1 to 24 hours at formation temperature;
   (d) injecting said fluid into the formation to enter and saturate at least a portion of the formation adjacent to the well; and
   (e) allowing the injected fluids to remain in the formations for at least four hours to accomplish at least partial polymerization of the resin, forming a consolidated resin-sand mass around the wellbore.

2. A method recited in claim 1 wherein the resin is an oligomer of furfuryl alcohol.

3. A method as recited in claim 2 wherein the concentration of the furfuryl alcohol oligomer is from 40% to 80% by volume based on the total volume of the treating fluid.

4. A method as recited in claim 2 wherein the concentration of furfuryl alcohol oligomer is from 50% to 60% by volume based on the total volume of the fluid.

5. A method as recited in claim 1 wherein the polar organic diluent is a hydrolyzable ester.

6. A method as recited in claim 5 wherein the polar organic diluent is butyl acetate.

7. A method as recited in claim 6 wherein the concentration of butyl acetate in the treating fluid is from 20% to 60% by volume.

8. A method as recited in claim 6 wherein the concentration of butyl acetate in the treating fluid is from 20% to 50% by volume.

9. A method as recited in claim 1 wherein the concentration of the dual acid catalyst is selected to cause polymerization of the polymerizable resin at the formation temperature in from 1 to 4 hours.

10. A method as recited in claim 9 wherein the concentration of acid catalyst is from ½% to 5% by volume.

11. A method as recited in claim 9 wherein the concentration of acid catalyst is from ½% to 3% by volume.

12. A method as recited in claim 1 wherein the first acid pK is from 0.4 to 0.8

13. A method as recited in claim 12 wherein the first acid is selected from the group consisting of aryl sulfonic acids.

14. A method as recited in claim 13 wherein the acid is toluene sulfonic acid.

15. A method as recited in claim 13 wherein the acid is xylene sulfonic acid.

16. A method as recited in claim 13 wherein the acid is benzene sulfonic acid.

17. A method as recited in claim 1 wherein the second acid pK is from 0.8 to 2.1.

18. A method as recited in claim 17 wherein the second acid is dicarboxylic acid.

19. A method as recited in claim 18 wherein the second acid is oxalic acid.

20. A method as recited in claim 18 wherein the second acid is malonic acid.

21. A method as recited in claim 1, wherein the volume ratio of the first to the second acid is from 1 to 100.

22. A method as recited in claim 1, wherein the volume ratio of the first acid to the second acid is from 1 to 30.

23. A method as recited in claim 1 comprising the additional steps of injecting after the resin-containing fluid has been injected, a second fluid comprising water and inorganic salts, into the same portion of the formation as the resin containing fluid, to establish permeability in the treated portion of the formation.

24. A method as recited in claim 23 wherein the aqueous fluid is a sodium chloride brine.

25. A method as recited in claim 23 wherein the sodium chloride brine is at least 70% saturated.

26. A method as recited in claim 25 wherein the aqueous fluid is saturated sodium chloride brine.

27. A method as recited in claim 23 wherein the volume of aqueous fluid injected into the formation after injecting the treating fluid is about equal to the volume of treating fluid used.

28. A method as recited in claim 1 wherein the resin-containing fluid is prepared by dissolving the two acid catalysts in the polar organic diluent and then mixing with the resin.

29. A method as recited in claim 1 wherein the volume of treating fluid injected into the formation is sufficient to saturate the pore space of the formation adjacent to the producing well for a distance up to 12 inches from the well.

30. A method as recited in claim 1 wherein the formation temperature is from 60° F. to 250° F. and the first acid catalyst is selected from the group consisting of toluene sulfonic acid, hydrochloric acid, sulfuric acid, nitric acid, and mixtures thereof.

31. A method as recited in claim 30 wherein the acid is toluene sulfonic acid.

32. A method as recited in claim 30 wherein the second acid catalyst is selected from the groups consisting of oxalic acid, maleic acid, iodic acid and dichloroacetic acid.

33. A method as recited in claim 32 wherein the second acid catalyst is oxalic acid.

34. A method as recited in claim 32 wherein the second acid catalyst is maleic acid.

35. A method as recited in claim 1 wherein the formation temperature is from 200° F. to 300° F. and the first acid catalyst is selected from the group consisting of oxalic acid, iodic acid, maleic acid, dichloroacetic acid, trichloroacetic acid and mixtures thereof.

36. A method as recited in claim 35 wherein the acid is oxalic acid.

37. A method as recited in claim 1 wherein the dual acid resin and diluent fluid is dispersed as a discontinuous phase in a non-condensable gas to form an aerosol treating fluid, and this aerosol treating fluid is injected into the formation to form a permeable consolidated mass in the portion of the formation adjacent to the well.

38. A method as recited in claim 37 wherein the gas is nitrogen, air or a mixture thereof.

* * * * *

UNITED STATES PATENT AND TRADEMARK OFFICE
CERTIFICATE OF CORRECTION

PATENT NO. : 5,377,759
DATED : January 3, 1995
INVENTOR(S) : Billy Wayne Surles

It is certified that error appears in the above-indentified patent and that said Letters Patent is hereby corrected as shown below:

Column 16,
Claim 20, line 63, please substitute --maleic-- for "malonic"

Signed and Sealed this

Fourth Day of April, 1995

Attest:

BRUCE LEHMAN

Attesting Officer     Commissioner of Patents and Trademarks